(12) United States Patent
Raab

(10) Patent No.: US 7,904,454 B2
(45) Date of Patent: Mar. 8, 2011

(54) DATABASE ACCESS SECURITY

(75) Inventor: Moshe Raab, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 10/483,275

(22) PCT Filed: Jun. 16, 2002

(86) PCT No.: PCT/IL02/00575
§ 371 (c)(1),
(2), (4) Date: Jan. 3, 2005

(87) PCT Pub. No.: WO03/009174
PCT Pub. Date: Jan. 30, 2003

(65) Prior Publication Data
US 2006/0059154 A1    Mar. 16, 2006

Related U.S. Application Data

(60) Provisional application No. 60/305,206, filed on Jul. 16, 2001.

(51) Int. Cl.
*G06F 17/30* (2006.01)
(52) U.S. Cl. .................................. 707/733; 707/749
(58) Field of Classification Search .............. 707/9, 101, 707/749, 733
See application file for complete search history.

(56) References Cited

U.S. PATENT DOCUMENTS

| | | | |
|---|---|---|---|
| 4,451,916 A | 5/1984 | Casper et al. | |
| 4,611,205 A | 9/1986 | Eglise | |
| 4,672,572 A | 6/1987 | Alsberg | 364/900 |
| 4,956,769 A | 9/1990 | Smith | 707/9 |
| 5,224,058 A | 6/1993 | Mickaels | |
| 5,261,102 A | 11/1993 | Hoffman | 713/200 |
| 5,299,257 A | 3/1994 | Fuller et al. | |
| 5,325,290 A | 6/1994 | Cauffman et al. | |
| 5,355,474 A | 10/1994 | Thuraisngham et al. | 707/9 |
| 5,557,742 A | 9/1996 | Smaha et al. | 713/200 |

(Continued)

FOREIGN PATENT DOCUMENTS

EP    0398645 A2    11/1990

(Continued)

OTHER PUBLICATIONS

Dar et al., "dbSwitch™: towards a database utility", Proceedings of the 2004 ACM SIGMOD international conference on Management of data, Jun. 2004, p. 892-896. Retrieved from the Internet:<URL:http://portal.acm.org/ft_gateway.cfm?id=1007679&type=     pdf&coll=ACM&dl=ACM&CFID=59243114&CFTOKEN=20435778>.*

(Continued)

*Primary Examiner* — John E Breene
*Assistant Examiner* — Dennis Myint
(74) *Attorney, Agent, or Firm* — Terrence J. Carroll; SVL IP Law

(57) ABSTRACT

Apparatus for protection of database objects from unwanted access, particularly from external connections via a firewall (20). The apparatus comprises a data packet parsing unit (54) for parsing a data packet to find database operation commands in the packet, and an enforcement unit (56) for applying enforcement rules to the data packet, thereby to protect respective database objects. The apparatus may form an additional layer (50, 52) of protection in conjunction with a firewall (20) to protect internal data.

30 Claims, 6 Drawing Sheets

U.S. PATENT DOCUMENTS

| | | | |
|---|---|---|---|
| 5,594,899 A | 1/1997 | Knudsen et al. | |
| 5,606,668 A | 2/1997 | Shwed | 713/201 |
| 5,701,342 A | 12/1997 | Anderson et al. | 713/176 |
| 5,737,316 A | 4/1998 | Lee | |
| 5,758,083 A * | 5/1998 | Singh et al. | 709/223 |
| 5,825,772 A | 10/1998 | Dobbins et al. | |
| 5,826,267 A | 10/1998 | McMillan | 707/9 |
| 5,828,666 A | 10/1998 | Focsaneanu et al. | |
| 5,835,726 A | 11/1998 | Shwed et al. | 709/229 |
| 5,845,281 A | 12/1998 | Benson et al. | 707/9 |
| 5,848,233 A | 12/1998 | Radia et al. | 713/201 |
| 5,881,225 A | 3/1999 | Worth | 713/200 |
| 5,884,025 A | 3/1999 | Baehr et al. | 713/201 |
| 5,953,707 A | 9/1999 | Huang et al. | |
| 5,963,642 A | 10/1999 | Goldstein | 713/193 |
| 5,974,396 A | 10/1999 | Anderson et al. | |
| 5,978,788 A | 11/1999 | Castelli et al. | |
| 5,978,813 A | 11/1999 | Foltz et al. | |
| 6,009,475 A | 12/1999 | Shrader | 709/249 |
| 6,016,491 A | 1/2000 | Kou | 707/9 |
| 6,044,376 A | 3/2000 | Kurtzman, II | 707/102 |
| 6,049,821 A | 4/2000 | Theriault et al. | 709/203 |
| 6,052,447 A | 4/2000 | Golden et al. | |
| 6,061,797 A | 5/2000 | Jade et al. | |
| 6,070,243 A | 5/2000 | See et al. | |
| 6,075,926 A | 6/2000 | Atkins et al. | |
| 6,076,168 A | 6/2000 | Fiveash et al. | 713/201 |
| 6,081,900 A | 6/2000 | Subramaniam et al. | 713/201 |
| 6,085,191 A * | 7/2000 | Fisher et al. | 707/9 |
| 6,088,796 A | 7/2000 | Cianfrocca et al. | 713/152 |
| 6,097,399 A | 8/2000 | Bhatt et al. | |
| 6,105,027 A | 8/2000 | Schneider et al. | |
| 6,119,236 A | 9/2000 | Shipley | |
| 6,122,403 A | 9/2000 | Rhoads | |
| 6,125,447 A | 9/2000 | Gong | 713/201 |
| 6,151,601 A | 11/2000 | Papierniak et al. | |
| 6,192,476 B1 | 2/2001 | Gong | 713/201 |
| 6,205,475 B1 | 3/2001 | Pitts | |
| 6,226,749 B1 | 5/2001 | Carloganu et al. | 713/201 |
| 6,230,156 B1 | 5/2001 | Hussey | 707/10 |
| 6,236,996 B1 | 5/2001 | Bapat et al. | |
| 6,253,321 B1 | 6/2001 | Nikander et al. | 713/160 |
| 6,272,641 B1 | 8/2001 | Ji | 713/201 |
| 6,279,010 B1 | 8/2001 | Anderson | 707/202 |
| 6,298,327 B1 | 10/2001 | Hunter et al. | 705/1 |
| 6,304,975 B1 | 10/2001 | Shipley | |
| 6,311,272 B1 | 10/2001 | Gressel | |
| 6,330,562 B1 | 12/2001 | Boden et al. | |
| 6,332,163 B1 | 12/2001 | Bowman-Amuah | |
| 6,336,996 B1 | 1/2002 | Steiner | |
| 6,347,374 B1 | 2/2002 | Drake et al. | 713/200 |
| 6,347,376 B1 | 2/2002 | Attwood et al. | 713/201 |
| 6,356,941 B1 | 3/2002 | Cohen | 709/219 |
| 6,366,952 B2 | 4/2002 | Pitts | |
| 6,393,568 B1 | 5/2002 | Ranger et al. | 713/188 |
| 6,442,748 B1 | 8/2002 | Bowman-Amuah | |
| 6,460,046 B1 | 10/2002 | Meek | |
| 6,480,861 B1 | 11/2002 | Kanevsky et al. | |
| 6,496,850 B1 | 12/2002 | Bowman-Amuah | |
| 6,505,241 B2 | 1/2003 | Pitts | |
| 6,529,909 B1 | 3/2003 | Bowman-Amuah | |
| 6,529,948 B1 | 3/2003 | Bowman-Amuah | |
| 6,532,465 B2 | 3/2003 | Hartley et al. | |
| 6,550,057 B1 | 4/2003 | Bowman-Amuah | |
| 6,539,396 B1 | 5/2003 | Bowman-Amuah | |
| 6,578,068 B1 | 6/2003 | Bowman-Amuah | |
| 6,581,052 B1 | 6/2003 | Slutz | |
| 6,601,192 B1 | 7/2003 | Bowman-Amuah | |
| 6,606,660 B1 | 8/2003 | Bowman-Amuah | |
| 6,609,123 B1 | 8/2003 | Cazemier et al. | |
| 6,615,253 B1 | 9/2003 | Bowman-Amuah | |
| 6,633,936 B1 | 10/2003 | Keller et al. | |
| 6,636,585 B2 | 10/2003 | Salzberg et al. | |
| 6,658,091 B1 | 12/2003 | Naidoo et al. | |
| 6,658,625 B1 | 12/2003 | Allen | |
| 6,678,355 B2 | 1/2004 | Eringis et al. | |
| 6,681,331 B1 | 1/2004 | Munson et al. | |
| 6,687,702 B2 | 2/2004 | Vaitheeswaran et al. | |
| 6,694,368 B1 | 2/2004 | An et al. | |
| 6,714,778 B2 | 3/2004 | Nykanen et al | |
| 6,789,046 B1 | 9/2004 | Murstein et al. | |
| 6,807,546 B2 | 10/2004 | Young-Lai | |
| 6,820,082 B1 | 11/2004 | Cook et al. | |
| 6,842,105 B1 | 1/2005 | Henderson et al. | |
| 6,851,004 B2 | 2/2005 | Keller et al. | |
| 6,941,369 B1 | 9/2005 | Krack et al. | |
| 6,941,472 B2 | 9/2005 | Moriconi et al. | |
| 7,038,611 B2 | 5/2006 | Gounalis | |
| 7,043,541 B1 | 5/2006 | Bechtolsheim et al. | |
| 7,080,077 B2 | 7/2006 | Ramamurthy et al. | |
| 7,085,834 B2 | 8/2006 | Delany et al. | |
| 7,089,322 B1 | 8/2006 | Stallmann | |
| 7,111,059 B1 | 9/2006 | Garcea et al. | |
| 7,171,413 B2 | 1/2007 | Puz et al. | |
| 7,231,378 B2 | 6/2007 | Lawson et al. | |
| 7,308,388 B2 | 12/2007 | Beverina et al. | |
| 7,337,105 B2 | 2/2008 | Sugimoto | |
| 7,426,512 B1 | 9/2008 | Ben-Natan | |
| 7,437,362 B1 | 10/2008 | Ben-Natan | |
| 7,506,371 B1 | 3/2009 | Ben-Natan | |
| 7,694,134 B2 | 4/2010 | Witt et al. | |
| 2002/0007363 A1 | 1/2002 | Vaitzblit | |
| 2002/0010800 A1 | 1/2002 | Riley et al. | 709/249 |
| 2002/0019944 A1 | 2/2002 | Kou | |
| 2002/0027907 A1 | 3/2002 | Tateoka | 370/389 |
| 2002/0059451 A1 | 5/2002 | Haviv | 709/238 |
| 2002/0066033 A1 | 5/2002 | Dobbins et al. | 713/201 |
| 2002/0066038 A1 | 5/2002 | Mattsson et al. | |
| 2002/0078384 A1 | 6/2002 | Hippelainen | |
| 2002/0095496 A1 | 7/2002 | Antes et al. | 709/225 |
| 2002/0095603 A1 | 7/2002 | Godwin et al. | 713/201 |
| 2002/0104017 A1 | 8/2002 | Stefan | 713/201 |
| 2002/0129140 A1 | 9/2002 | Peled et al. | 709/224 |
| 2002/0129271 A1 | 9/2002 | Stanaway et al. | 713/201 |
| 2002/0133723 A1 | 9/2002 | Tait | 713/201 |
| 2002/0147726 A1 | 10/2002 | Yehia et al. | 707/101 |
| 2002/0147927 A1 | 10/2002 | Tait | 713/201 |
| 2002/0152399 A1 | 10/2002 | Smith | 713/200 |
| 2002/0154646 A1 | 10/2002 | Dubois et al. | |
| 2002/0157020 A1 | 10/2002 | Royer | |
| 2002/0177910 A1 | 11/2002 | Quarterman et al. | |
| 2003/0028624 A1 | 2/2003 | Hasan et al. | |
| 2003/0046302 A1 * | 3/2003 | Miron | 707/104.1 |
| 2003/0084320 A1 | 5/2003 | Tarquini et al. | |
| 2003/0084328 A1 | 5/2003 | Tarquini et al. | |
| 2003/0182850 A1 | 9/2003 | Lee | |
| 2003/0217069 A1 | 11/2003 | Fagin et al. | |
| 2004/0024764 A1 | 2/2004 | Hsu et al. | |
| 2004/0093506 A1 | 5/2004 | Grawrock et al. | |
| 2004/0111344 A1 | 6/2004 | Fetter et al. | |
| 2004/0111623 A1 | 6/2004 | Miller et al. | |
| 2004/0117037 A1 | 6/2004 | Hinshaw et al. | |
| 2004/0143733 A1 | 7/2004 | Ophir et al. | |
| 2004/0255301 A1 | 12/2004 | Turski et al. | |
| 2004/0260947 A1 | 12/2004 | Brady et al. | |
| 2005/0005031 A1 | 1/2005 | Gordy et al. | |
| 2005/0071650 A1 | 3/2005 | Jo et al. | |
| 2005/0086529 A1 | 4/2005 | Buchsbaum | |
| 2005/0097149 A1 | 5/2005 | Vaitzblit et al. | |
| 2005/0149537 A1 | 7/2005 | Balin et al. | |
| 2006/0242431 A1 | 10/2006 | LeCrone et al. | |
| 2007/0112864 A1 | 5/2007 | Ben-Natan | |
| 2007/0180275 A1 | 8/2007 | Metzger et al. | |
| 2009/0271453 A1 | 10/2009 | Ben-Natan | |
| 2010/0131512 A1 | 5/2010 | Ben-Natan et al. | |
| 2010/0131758 A1 | 5/2010 | Ben-Natan | |
| 2010/0132024 A1 | 5/2010 | Ben-Natan et al. | |

FOREIGN PATENT DOCUMENTS

| | | |
|---|---|---|
| WO | WO9831124 | 7/1998 |
| WO | WO9966384 | 12/1999 |

OTHER PUBLICATIONS

Feamster et al., "A model of BGP routing for network engineering", Proceedings of the joint international conference on Measurement and modeling of computer systems, Jun. 2004, p. 331-342. Retrieved from the Internet:<URL: http://portal.acm.org/ft_gateway.cfm?id=1005726&type=pdf&coll=ACM&dl=ACM&CFID=59243114&CFTOKEN=20435778>.*

Dar et al., "dbSwitch™: towards a database utility", Proceedings of the 2004 ACM SIGMOD international conference on Management of data, Jun. 2004, P-892 - 896. Retrieved from the Internet:<URL:http://portal.acm.org /ft_gateway.cfm?id=1007679&type= pdf&coll=ACM&dL=ACM&CFID=59243114&CFTOKEN=20435778>.*

Feamster et al., "A model of BGP routing for network engineering", Proceedings of the joint international conference on Measurement and modeling of computer systems, Jun. 2004, P-331 - 342. Retrieved from the Internet:<URL: http://portal.acm.org/ft_gateway.cfm?id=1005726&type=pdf&coll=ACM&dl=ACM&CFID=59243114&CFTOKEN=20435778>.*

Lunt et al., "IDES: A Progress Report," IEEE, 1990.

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection," Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, ©1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ Dec. 7-11, 1998, pp. 13-24.

Gangadharan, Muralidaran, et al., "Intranet Security with Micro-Firewalls and Mobile Agents for Proactive Intrusion Response," IEEE Int'l Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, ® 1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybermetics—Part A: Systems and Humans, vol. 31, No. 4, Jul. 2001, pp. 331-336.

SQL Guard Version 4.0.2 User Guide, Aug. 18, 2005.

SQL Guard Version 4.0.2 Administrator Guide, Aug. 18, 2005.

User Guide for SQL Guard Version 5.1, Jul. 14, 2006.

Administrator Guide for SQL Guard Version 5.1, Jul. 21, 2006.

Sreenivasa Rao M et al., "A New Neural Network Architecture for Efficient Close Proximity Match of Large Databases", Database and Expert Systems Applications, 1997; Proceedings., Eighth International Workshop of Toulouse, France, Sep. 1-2, 1997, Los Alamitos, CA; pp. 444-449.

EP Search Report data Sep. 29, 2010; cited in EP application No. 02747645.6.

* cited by examiner

DATABASE ACCESS SECURITY

This U.S. Patent Application is a filing under 35 U.S.C. 371 of International Application No.: PCT/IL02/00575, filed Jul. 16, 2002, entitled "IMPROVEMENTS IN OR RELATING TO DATABASE ACCESS SECURITY" which claims the benefit of U.S. Provisional Patent Application Ser. No. 60/305,206, filed Jul. 16, 2001, entitled "SQL-guard". The entire contents and teachings of this referenced application are hereby incorporated by reference herein.

FIELD OF THE INVENTION

The present invention relates to database access security and more particularly but not exclusively to a method or apparatus for securing database material against unauthorized access from an external network whilst at the same time permitting legitimate access from the external network. Examples of database systems of interest are MS-SQL Server, Oracle, DB2 and UDB.

BACKGROUND OF THE INVENTION

Networks typically require users to log on, that is give usernames and passwords to gain access. Based on the username the network may decide on a level of access. Local Area Networks are typically connected to the outside world and often have a firewall to protect the perimeter of the LAN from external intrusions. The firewall may permit users to log in from outside the LAN. Such users are hereinafter referred to as external users, by contrast with internal users, whose connections are from within the perimeter of the LAN. The firewall may apply restrictions to such external users, or may not allow them at all, and the firewall may also monitor and control e-mail, web-interaction and the like. Typically, in the case of the external user, the firewall may check the username at the periphery and decide what access level to provide. The firewall may specify particular machines on the LAN to which the externally connecting user is permitted access, or it may provide general access, but once access to a machine is granted, the access is unrestricted. The firewall does not monitor, validate or in any other way consider actual usage, except in the case of widely known protocols, as discussed below.

Today, an organization's information systems are often prime targets for vandalism and theft, and organizations are especially concerned about the activities performed by external users. Loss or corruption of a database can be catastrophic for an organization, and information in the database can be of use to rivals. A database that includes customers' credit card numbers, or staff bank account numbers, can be of great interest to thieves. Currently, external users are able to log in, and the resulting access connection is assigned use rights associated with the logged in user. On the one hand, the organization wishes to allow staff to be able to work from home or have access to the LAN whilst traveling etc. yet at the same time free external access gives rise to threats of the kind described above. It is a goal of firewall technology to provide maximal levels of security for minimal levels of inconvenience, and one way of achieving this goal is to target access restrictions as closely as possible to the kind of activity which constitutes the threat, leaving non-threat bearing activity to continue unimpeded.

To reduce possible threats, organizations are therefore moving to implement application specific security that can monitor the actual activity of external users and block activity that is suspicious, thereby to protect against intrusion from outside the LAN that is application specific. Software packages that provide data use surveillance already exist on the market. However, the existing packages are restricted to well known and standardized protocols such as HTTP, SMTP and FTP. These packages are able to identify the use of the particular protocol and use their knowledge of the protocol to monitor and control the content. Databases however, do not use any single recognized protocol. Indeed most database packages are not accompanied by any published protocol and most database versions, even from the same source, include variations in the protocol used. There is thus no application specific security package that is currently aimed at databases, and it is not currently possible to carry out content based monitoring and control of database queries or results.

SUMMARY OF THE INVENTION

An object of the present invention is to provide a data security layer that monitors and/or controls database access statements or commands, for example the actual SQL statements that constitute much database activity for users and application servers. As mentioned above, typical database systems include MS-SQL Server, Oracle, DB2 and UDB.

According to a first aspect of the present invention there is thus provided apparatus for protection of database objects from unwanted access comprising:

a data packet inspection unit for inspecting passing data packets to find and carry out an analysis of database operation text within said packet, and an enforcement unit, associated with said data packet inspection unit for applying enforcement rules to said data packet, based at least partly on said analysis, thereby to protect respective database objects.

Preferably, said data inspection unit comprises a packet analysis unit to look for structure associated with database operation text, and a parsing unit, associated with said search unit to parse said database operation text into underlying statements comprising at least database operation commands and database objects.

Preferably, said data packet inspection unit is configurable in association with a firewall between an external network and an internal LAN containing said database objects, thereby to guard a respective database.

Preferably, said inspection unit is configurable to be positioned between two LANs.

Preferably, said data packet inspection unit is further operable to find information regarding sources of respective data packets and regarding data objects of respective commands.

Preferably, said enforcement rules each comprise at least one condition, said condition being the presence in the database operation text of a predetermined database operation command.

Preferably, said enforcement rules each comprise at least one condition, said condition being the presence in the database operation text of any one of a group of database operation commands belonging to a preformulated group.

Preferably, said wherein said enforcement rules each comprise at least one condition, said condition being the specification within the database operation text of a predetermined database object.

Preferably, said enforcement rules each comprise at least one condition, said condition being the specification within the database operation text of any one of a group of database objects belonging to a preformulated group.

The apparatus may further comprise a management module for setting said enforcement rules.

Preferably, said management module is further operable to define groups of database commands, said groups being usable to define said rules.

Preferably, said management module is accessible via a graphical user interface.

Preferably, said management module is operable to set an access policy comprising a plurality of rules, each rule specifying a group of commands, a group of users and a group of data objects, said access policy being transferable to said rule application unit.

Preferably, at least some of said enforcement rules define logging activities and said enforcement unit further comprises logging functionality therefor.

Preferably, said inspecting comprises obtaining a signature from said database operation text and wherein at least some of said rules relate at least in part to said signatures.

According to a second preferred embodiment of the present invention there is provided a method for protection of database objects from unwanted access comprising:

parsing a data packet to find database operation commands in said packet, and applying enforcement rules to said data packet, said rules specifying conditions based at least partially on said database operation commands, thereby to protect respective database objects.

The method may further comprise finding information regarding sources of respective data packets and regarding data objects of respective commands.

Preferably, said finding information regarding sources of respective data packets is carried out per user connection, the method further comprising associating said sources with data packets of said user connection.

The method may further comprise applying said enforcement rules selectively to said data packets, depending on information found in respective data packets by said parsing units.

Preferably, said database operation commands are arranged in groups and wherein said rules relate to said groups.

Preferably, said command sources are arranged in groups and said rules relate to said groups.

Preferably, said database objects are arranged in groups and wherein said rules relate to said groups.

The method may further comprise arranging said database commands into groups and using said groups to define said rules.

The method may further comprise forming an access policy by arranging together a plurality of rules for use.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
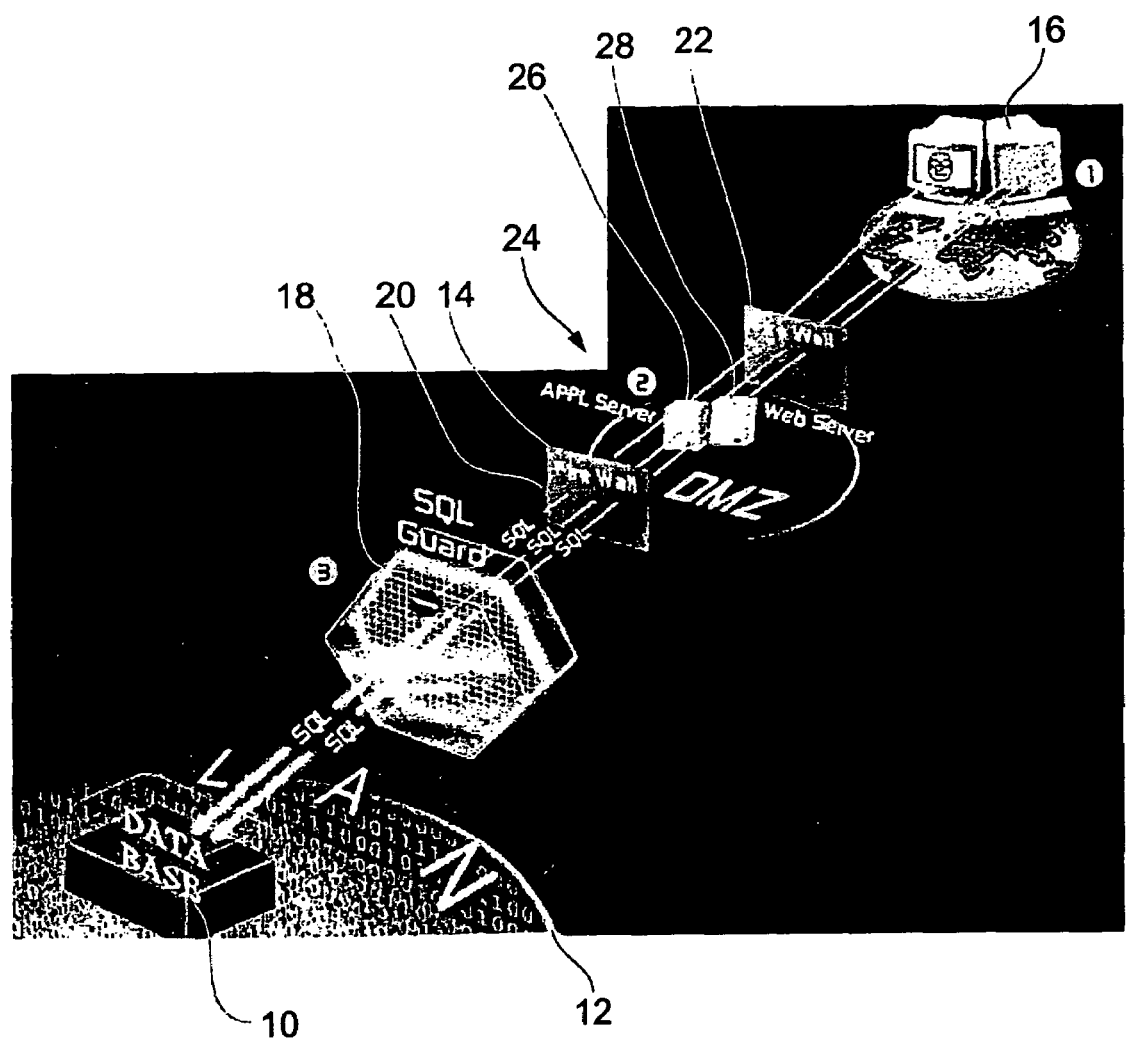
FIG. 1 is a generalized schematic diagram illustrating a general concept of a first preferred embodiment of the present invention.

The present embodiments provide a system for monitoring and or controlling database command statements as they pass in to a LAN from an external connection. The commands used may be monitored by the embodiments as well as the source of the commands and the data objects to which the commands apply. Rules and policies define legitimate and illegitimate activity by using the various commands, sources and objects, so that for example different grades of data can be protected from different types of uses by different users or categories of user. In the present embodiments, protection is not provided by access permissions assigned following log-in operations, but rather by the actual data as found in the individual data packet, in particular by the database access or operational commands, especially SQL commands. Thus, non-database activity is not affected by the embodiments and furthermore, database restrictions can be made as specific as possible so as to target threats with as little effect as possible on legitimate database activity.

The embodiments described herein are for use together with a firewall, although additional embodiments that may be used on their own to provide database protection are contemplated.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified schematic diagram showing a generalized embodiment of the present invention. In FIG. 1, a database 10 is located on a LAN 12. The LAN 12 is protected by a firewall 14, through which external users 16 are able to connect in order to use the database. External users who successfully negotiate the firewall, are typically able to make use of the database, and the firewall is typically able to grant or refuse access to the computer on which the database is located. The firewall itself is not able to provide database protection that is more sophisticated than providing access or no access. Thus, according to the present embodiments, there is provided an additional layer of protection 18, referred to hereinbelow as an SQL filter, which operates regardless of permission levels granted by the firewall 14, and which checks passing data packets for SQL or other database commands. If it finds database commands then it uses its own rules, again independent of the firewall, to decide whether the data packet should be allowed to pass. However, in current embodiments the system administrator has the responsibility of ensuring that all incoming packets pass through the filter.

The firewall 14 is shown as a two-part firewall, having a first firewall part 20, and a second firewall part 22 with a demilitarized zone, (DMZ) 24 in between. The demilitarized zone typically includes a web server 26 and an application server 28. In one configuration, if it is desired to permit outside users 16 to access database 10 then an application, that is to say a database client, for using the database, is placed in the DMZ 24. The external user connects to the database client and uses the database client to generate SQL code to access the database. Thus, data packets directed inwardly from the firewall, and being intended to interrogate or manipulate the database, may be expected to carry SQL or like database operating commands. The SQL filter 18 preferably snoops data packets passing between the firewall and the LAN, identifies and analyzes any SQL material in the packets and applies rules to decide whether the packets may pass or not. The rules are preferably independent of those applied by the firewall.

Figure 2:
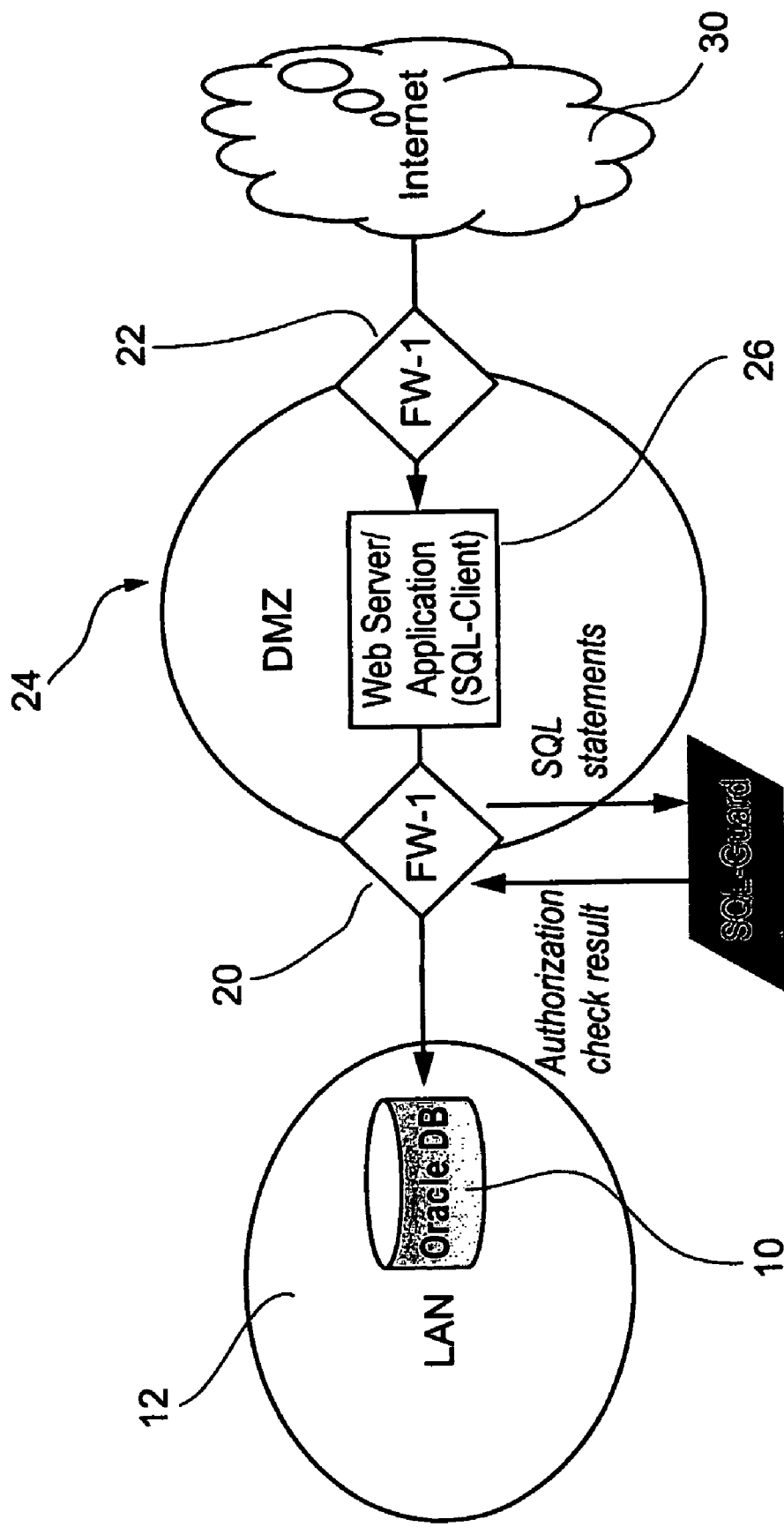
FIG. 2 is a simplified schematic diagram showing a second preferred embodiment of the present invention, in which an SQL filter is located inwards of a DMZ, the DMZ having a database query application.

Reference is now made to FIG. 2, which is a representation in block diagram form of an embodiment operative in accordance with the present invention, and which is similar to the generalized embodiment of FIG. 1, with some minor variations. Parts that are the same as in FIG. 1 are given the same reference numerals and are not referred to again except as necessary for an understanding of the present embodiments. In FIG. 2 the SQL filter 18 is shown to be part of the inner firewall 20. The server 26 is shown to support an SQL application and the SQL guard checks data packets passing the inner firewall and either authorizes them, in which cases they proceed, or it rejects them, in which case the packets are dropped. The DMZ 24 carries a database client application 26, as before so that an external user may connect to the client in the DMZ and issue database commands. The issued database commands are forwarded to the inner firewall 20.

At the inner firewall 20, which constitutes the entry point to the user organization's LAN 12, the SQL-filter obtains the traffic to the database, and only such traffic. If other protocols attempt to pass through SQL-filter they are preferably rejected. The SQL filter assumes that all data traffic towards the database from the outside is directed through the filter by other network devices, and it is the responsibility of the network administrator to make sure that there is no alternative unsecured path to the database. The filter analyzes the data stream and finds user names of the externally connecting users, and any SQL statements within the data packets. The proxy holds a security policy, as will be explained in more detail below. The policy comprises a list of security rules for accepting or rejecting the packets. The rules preferably determine authorization levels on a packet by packet basis, and may take into account such information as the user name, the SQL commands in the packet (e.g. select, update) and the database objects (e.g. a table name, view name) to which the SQL is applied.

The SQL-filter 18 of the embodiment of FIG. 2 is a proxy to the inner part of the firewall and receives therefrom notifications on new TCP connections to the database servers. The filter 18 preferably obtains all of the data stream of the database server protocol for screening. The SQL-filter may authorize or forbid any database request in accordance with the rules as currently set, as discussed above.

A currently available prototype is provided as an add-on to Firewall-1 by Check Point. Using the OPSEC (Open Platform for Security) by Check Point, the firewall is induced to tunnel the relevant data stream to the SQL-filter, which is then able to perform its function of filtering the database commands. The prototype is suitable for any kind of database system, but in particular the MS-SQL Server, Oracle Server, DB2 and UDB.

Figure 3:
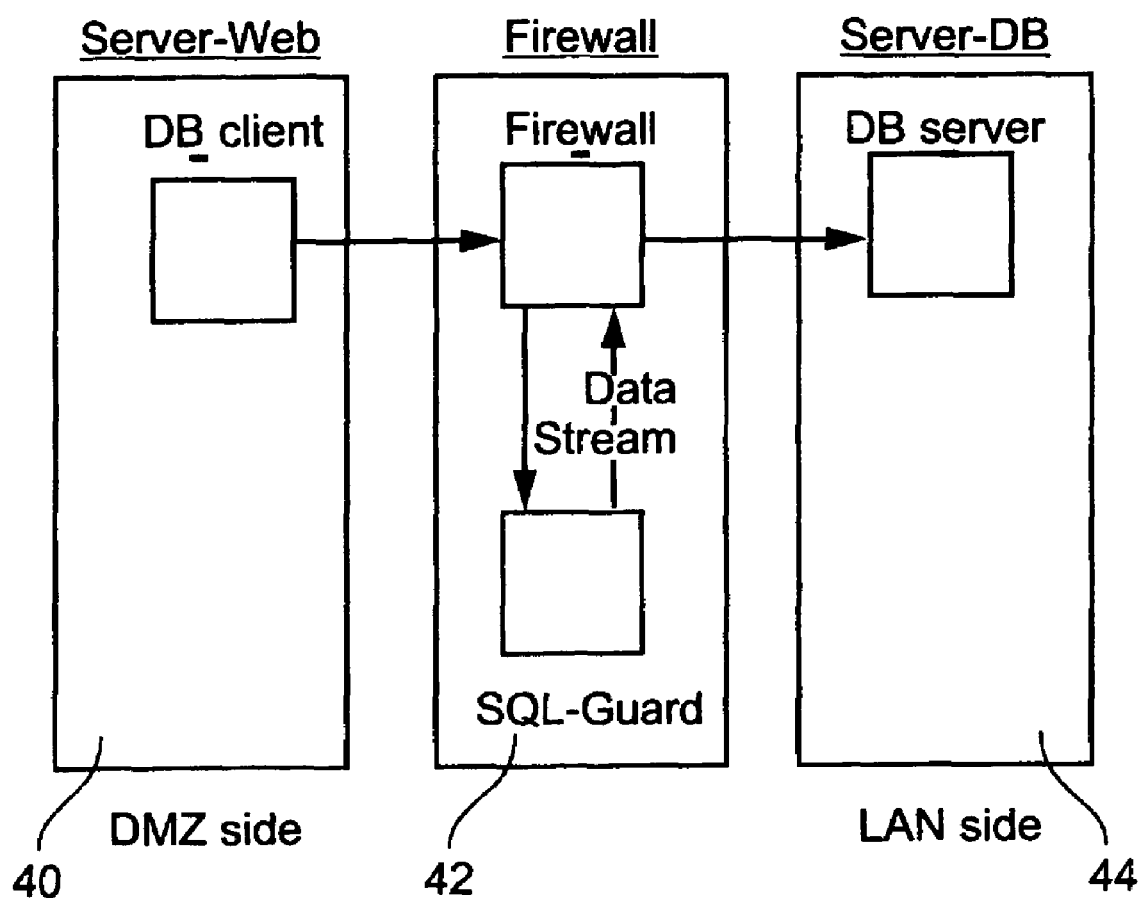
FIG. 3 is a simplified schematic diagram of three versions of the embodiment of FIG. 2, in which the elements of the embodiment of FIG. 2 are mapped onto a series of servers.

Reference is now made to FIG. 3, which includes simplified server block diagrams showing the arrangement of FIG. 2 mapped to a series of servers. In the configuration of FIG. 3, a first server 40 holds the DMZ and the database application, a second server 42 holds the inner firewall and the SQL guard, and a third server 44 holds the database that the application in the first server 40 is intended to query. The next configuration of FIG. 3 is the same except that the application within the DMZ routes SQL-bearing data packets to the SQL filter, rather than this being the responsibility of the firewall. In the next configuration of FIG. 3, the firewall once again has the responsibility of routing SQL-bearing data packets to the filter, however the filter itself is located in the safe zone within the firewall.

The arrangement of FIG. 3 shows the SQL-filter as a stand-alone proxy, whether on the firewall server 42 or within the LAN. In accordance with any of the above configurations, the database, on the database server 44, is only able to receive data that has been approved by the filter.

SQL-filters according to various of the present embodiments can analyze data streams on any relational database technology, e.g. MS-SQL Server, DB2, and UDB by IBM. Filters according to the preferred embodiments require only the following, that a User name or like identification can be identified, and that requests are sent as SQL statements. Other embodiments may relate to other systems of database commands and the SQL requirement may be modified accordingly.

Figure 4:
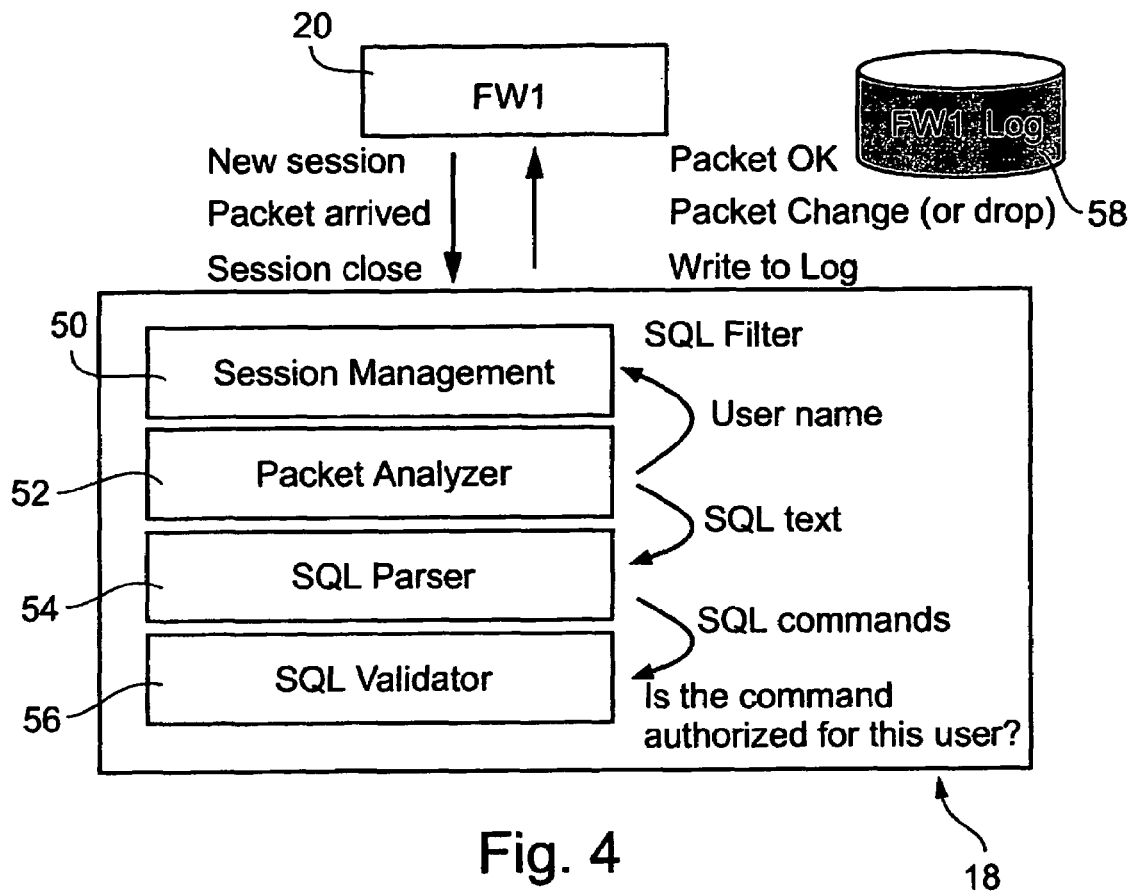
FIG. 4 is a simplified schematic diagram showing in greater detail the SQL filter of FIGS. 1-3.

Reference is now made to FIG. 4, which is a simplified diagram showing in greater detail an SQL filter 18 suitable for the embodiments of FIGS. 1-3. As discussed above, the filter monitors packets passing through the inner firewall 20, and comprises four internal units, a session management unit 50, a packet analyzer 52, an SQL parser 54 and an SQL validator 56. The internal units are now considered in turn. First of all the session management unit 50 performs overall management of individual connecting sessions. The session manager is responsible for holding data for each TCP connection or session, including IP addresses, user name, and internal control data, hereinafter referred to as session data. For each incoming packet in the data stream, the session manager associates the appropriate session data as a context for any SQL statement contained within the packet.

The packet analyzer 52 analyzes packet content to find SQL text within the packet. SQL text is passed to the SQL parser to identify the commands and the data objects to which it relates, and then all of the information obtained is passed on to the SQL validator which determines whether the commands are authorized for the identified data object for the user identified in the corresponding session data. For convenience in the formulation of rules, the rules used by the validator do not usually relate to individual commands or users or data objects but rather to groups of commands, groups of users and groups of objects, as will be explained in greater detail below.

The packet analyzer 52 is responsible for identifying SQL messages in the data stream. The TCP connection is a stream-wise connection. However SQL statements, which constitute the database requests, have specific structure, attributes and length, which may be identified.

The packet analyzer is responsible for isolating the database requests in the data stream, and then analyzing as follows:

On initialization—the packet analyzer obtains the source and target addresses, the protocol version, and the connected user. This data is placed in the session manager.

In the course of the session, the packet analyzer identifies messages that contain SQL text, including underlying statements or requests, and isolates the SQL text. The SQL text is passed to the SQL parser 54 for parsing and authorization checking.

In a further preferred embodiment the packet analyzer also checks other types of messages, for example the results of the query. For example it is possible to define the filter to prevent an external user from downloading more than a certain number of items from the database. In this embodiment, the packet analyzer checks outgoing packets as well as incoming packets.

Database vendors tend to adapt database protocol structures for their own purposes, as will be discussed in more detail below, and the analyzer is preferably designed or programmed to accord with the protocol specification as used by the vendor of the database server in question. In a company that uses multiple databases from multiple vendors the analyzer is preferably able to determine, typically from the session manager, which database is being interrogated, and to select the correct protocol for use in parsing.

The SQL parser 54 receives data from the packet analyzer 52 as described above, and then is responsible for extracting the commands and objects that appear in the SQL text within the packets. The parser 54 preferably operates by breaking down the text of the SQL messages into underlying statements. Individual underlying statements may trigger more than one authorization action from the filter. For example a single statement may contain multiple objects, each needing separate authorization, or the statement may by its structure require several authorization actions. For example a single statement may gather information from several sources to be shown in a single view. Each source may be required to be authorized separately.

In the prototype referred to hereinabove, the SQL parser is based on LEX and YACC technology, which are available both commercially and as freeware. SQL keywords are treated as tokens and are predefined to the LEX environment. The SQL statement format is likewise defined to the LEX environment. Generally SQL definition uses an ANSI standard, however individual vendors tend to make significant modifications, mainly in the DDL (Data Definition Language) part of the language. Individual implementations preferably follow the database vendor language reference to ensure that the filter gives full coverage of all the SQL dialect of the database being protected, as discussed above in respect of the analyzer.

While parsing the language the parser collects commands and corresponding objects from the data stream. Each command and object combination is checked immediately, together with the corresponding session data to determine whether the user is authorized or not for the requested database action defined by the command and object combination. If the user is not authorized, the entire SQL text portion under investigation is preferably rejected, and as a further sanction the session with the user may be ended. Authorizations are checked via the SQL Validator 56, as described below.

The SQL validator 56 receives validation requests from the parser and carries out validation based on the information supplied by the parser. Validation requests are of the form: is user "SCOTT" allowed to carry out command "SELECT" from data object "EMP". On each identification of an SQL command and object in the parsing process, a validation request is issued to the validator 56.

The validation is carried out using a set of rules arranged in a data structure which is optimized to enable efficient finding of the highest priority rule that matches the authorization request. Typically this means that the data structure is arranged as a hierarchy.

On initialization, the SQL validator 56 loads a list of rules that belong to a currently set policy, and constructs an optimized structure therefrom. At predetermined intervals, or optionally upon occurrence of a predefined event, the validator 56 may check whether a new security policy has been set.

Upon receipt of the validation request, the data to be validated is matched against the optimized structure. The structure allows for rapid selection of the highest priority rule that fits the request. Following application of the appropriate rule, the packet is either allowed to pass or is discarded, and the event may be logged. All acts of discarding may be logged, or certain packets regarded as marginally suspicious may be logged but allowed through, as required by the user. The filter may conveniently make use of the log 58 of the firewall, or of a special log mechanism or of a private log.

The rules that are used are preferably grouped together into sets, and the sets of rules are the policies referred to herein. Policies can be exchanged to reflect changing security priorities, or for any other purpose.

Figure 5:
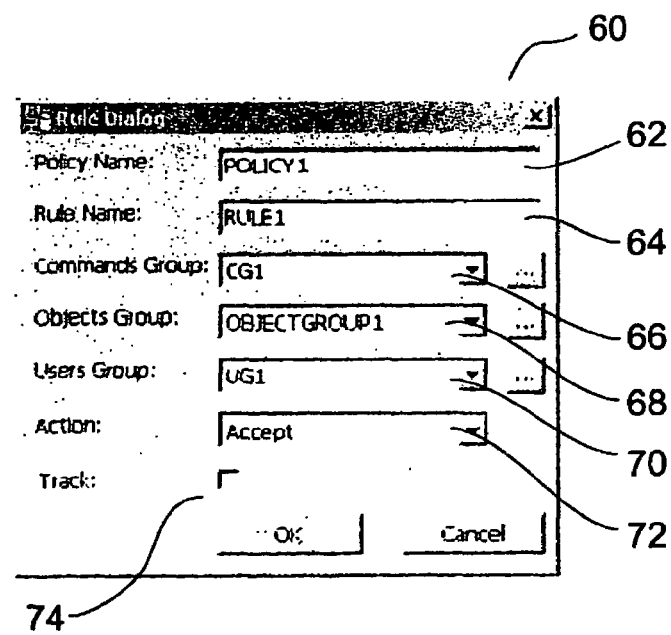
FIG. 5 is a generalized screen shot showing a dialog window for setting up a rule for the filter of FIG. 4.

Reference is now made to FIG. 5, which is a simplified diagram showing a dialog window 60 for setting up a rule. The dialog window has a plurality of fields for data entry. A policy name field 62 allows the rule to be associated with a policy, namely a group of rules. It will be appreciated that a single rule can be featured in a plurality of policies. A second field 64 allows the rule to be given a name, so that it can be referred to. A third field 66 allows a group of database operation commands to be specified. The database operation commands are typically SQL commands, e.g. Select, Create Table. The groups are preferably set in advance by the user for convenience in setting the rules. Thus, it may be useful to group database editing commands into one group, and database management commands into another group.

A fourth field 68 specifies an object or group of objects of the database command. The objects are the database objects referred to by the database commands, for example an SQL object name, e.g. table name, index name, and even stored procedure, and the group of objects is a group of such items. A fifth field 70 allows a group of users to be specified, and a sixth field 72 specifies the action that is to be taken if a data packet fits the rule. Typical actions, as discussed above, are accepting the packet, rejecting the packet, and an action known as "drop" which comprises both rejecting the packet and terminating the session, typically a TCP/IP session. A check box 74 allows the user to define whether the action should be logged.

Two exemplary rules are as follows:

Allow, User=SCOTT, Command=SELECT,
    Object=EMP

Reject, User=OTHER, Command=CREATE TABLE,
    Object=N/A

In the above rules individual users and commands are specified. However, it is not expedient to have to specify a separate rule for each combination of users and commands and objects. To ease the definition of rules—a user interface allows the administrator to define groups of users, groups of commands and groups of objects. A rule may typically be of the format 'allow', <user group>, <command group>, <object group>. The implication is a Cartesian combinations of all members of all the groups in the rule. It will be appreciated that the scopes of rules may be extended by the use of additional parameters, such as defining the time of the day when authorization is allowed.

The rule applies the action defined therein to any data packet that attempts to pass the filter. The filter is indeed similar to content filters used in current firewall technology, the difference being that the filter of the present embodiments uniquely looks for and recognizes the structure of SQL text.

Preferably, the filter is configured so that the default action for unrecognized packets is rejection, so that only those packets specifically recognized by a rule are allowed through. The filter thus behaves as if it has a default rule at the base of the rules hierarchy applying to all groups of commands, all users and all data objects and whose action is to reject. Only those packets recognized by a rule having an "accept" action higher up in the hierarchy are therefore going to be accepted. It is possible to change the default behavior by adding a rule at the base of the hierarchy applying to all groups and whose action is to reject and log, or reject and deny service.

It is noted that the use of default behavior means that when a new database version is installed, any new commands of the new version are not initially recognized and are therefore rejected. The filter is preferably updated with the new commands as soon as possible so that the commands can be accepted, however, until that happens, the default behavior ensures that modifications of the database do not lead to a hole in the security that the filter provides.

In a further preferred embodiment of the present invention, the analysis of the data packet involves obtaining a signature of the database text found therein. The rules used by the enforcement module then relate to the signature.

Figure 6:
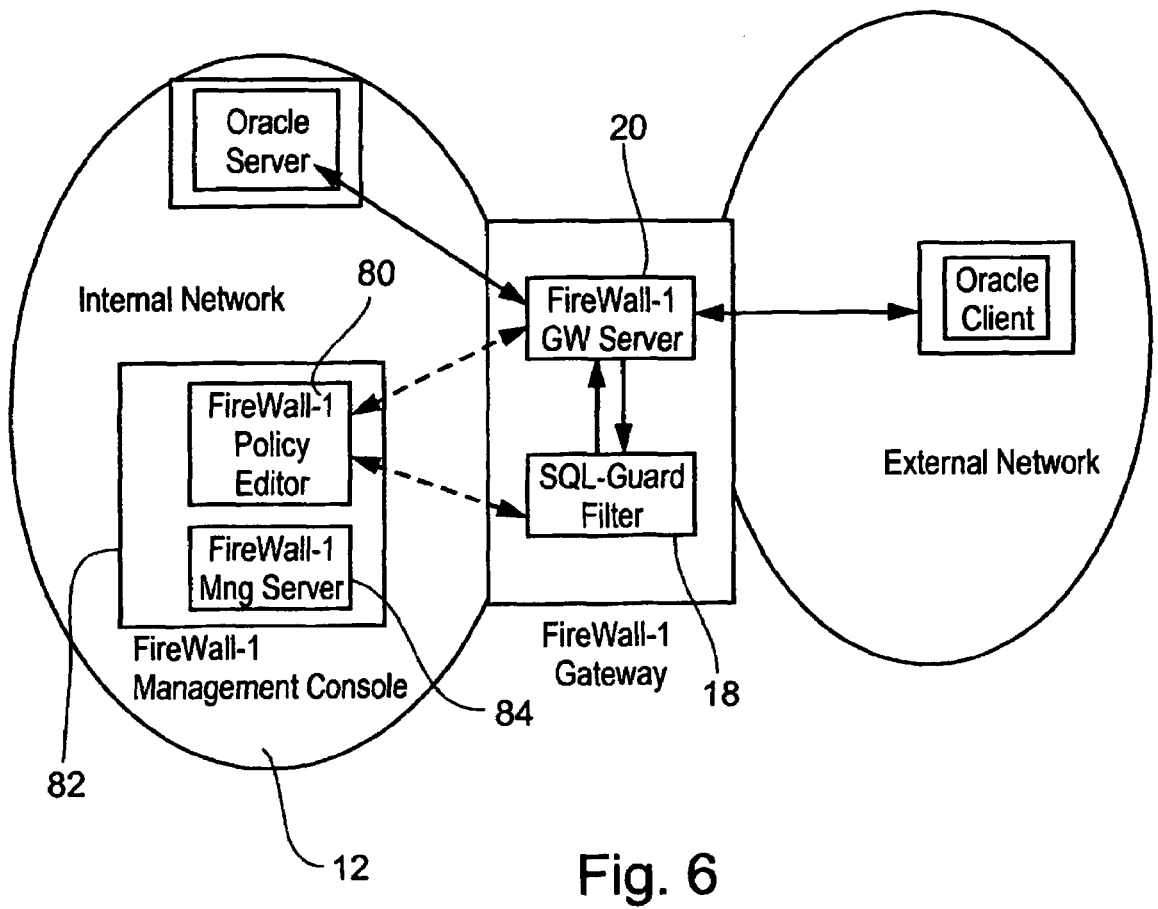
FIG. 6 is a generalized schematic diagram showing network configuration for the SQL filter of FIG. 4 and illustrating a management console for programming the filter.

Reference is now made to FIG. 6, which is a simplified block diagram showing how a filter system may be configured for a network. Parts that are the same as those in previous figures are given the same reference numerals and are not referred to again except as necessary for an understanding of the present embodiment. Preferably, the filter system comprises two component parts, both of which are configured to work together with the network firewall. A first part is a policy editor 80, which located within a firewall management console 82, alongside a firewall management server application 84, and which is placed behind the firewall 20 in the secure region of the user's internal network. The second part is the filter 18 itself, which is located together with the firewall 20.

It is noted that in FIG. 6, the accessing client application is located externally, by contrast with the situation shown in FIG. 1, wherein the client application was located in the DMZ. The location of the client application, which produces the database commands, is not critical to the present embodiments provided that the data packets produced by the client program pass the filter 18.

Figure 7:
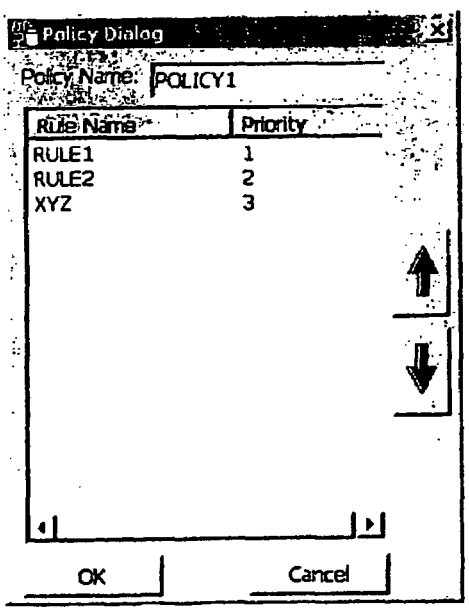
FIG. 7 is a generalized screen shot showing a dialog window for establishing a security policy for the filter of FIG. 4 by insertion of rules.

The policy editor 80 allows for rules to be formulated and edited and built into policies which may then be put into operation within the filter 18. The policy editor also allows for the arrangement of users, data objects and commands into groups, and for subsequent editing of the groups. The policy editor also allows for editing and arranging of policies themselves, and reference is now made to FIG. 7, which is a simplified diagram showing a policy dialog window. The policy dialog window shows a series of rules (rule 1, rule 2 etc) that have been chosen for inclusion within a policy. Each rule is given a priority, and one of the reasons for giving a priority is that there is no requirement that the rules are mutually exclusive. Thus, in the event of more than one rule applying, the filter has to know which rule is to be applied. The order of appearance of the rule in the policy rule defines its priority. The first rule that is correctly matched with the requested authorization, is the one that defines the authorization, and no subsequent matching is preferably carried out.

Figure 8:
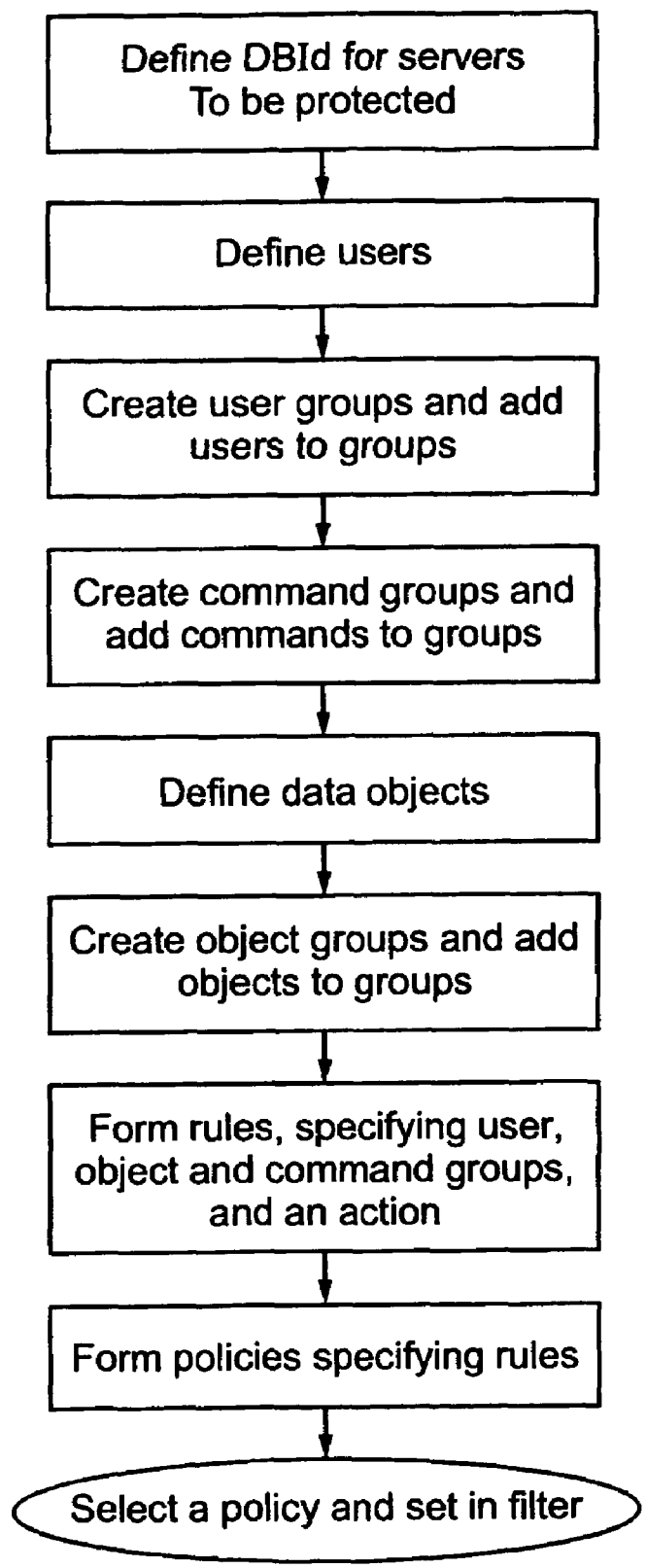
FIG. 8 is a simplified flow chart showing the process of creating a policy for use in the filter of FIG. 4.

Reference is now made to FIG. 8, which is a simplified flow chart showing the procedure for defining rules and policies. One or more database servers that it is desired to protect are firstly given defining identities. Secondly, users are defined, and thirdly groups are defined, and individual users are assigned to the groups. Optionally external connecting locations can be defined as trusted locations. The skilled person will appreciate that users are most effectively grouped according to access level requirements and security issues raised. Fourthly, the database command groups are assigned and individual commands are assigned to the groups. Fifthly, database objects are defined. Sixthly object groups are defined and the individual objects are assigned to groups. Finally individual rules are defined by specifying an object group, a user group and a command group and assigning an action thereto. The action can be modified by further defining whether it should be tracked or logged. Policies may then be defined by selecting rules into a hierarchy, and finally a most appropriate policy is selected for current use by the filter.

The embodiment described herein preferably provides a security layer, additional to that of the firewall, for protecting databases by filtering and monitoring SQL requests that are generated outside of the database server's local area network. The preferred embodiments scan all TCP/IP packets that are to be delivered to the database server, tracking each database command and authorizing or rejecting each command, based on a table of one or more policies, each comprising a set of rules, and which may be provided by the user, or which may be supplied as defaults. The policies establish which users can have access to the database, which commands they can use, and for which data objects in the database. It is noted that only one policy may be active at one time. Multiple policies are allowed within the system, but for different SQL-filter locations or different policies for different days. The latter may be desirable for example to permit remote maintenance on a specific day in the month.

The SQL-filter adds an additional layer of security to a database or database system by checking SQL statements that cross the firewall from external networks. Such statements are required by the filter to conform to authorization policies set by the system administrator to ensure that security breaches, such as compromised database passwords, misconfigured database security, database vulnerabilities etc. cause minimal damage. Using the present embodiments, it is possible to give a user a certain level of access when connecting within the organization, however to restrict his database access when connecting from outside of the organization. Thus any given user may connect from the outside and carry out non-database functions as he chooses. However, as soon as he attempts to carry out database access functions then the filter can be used to limit his activity independently of the firewall. It is thus possible to assign users with full rights to a database when connecting internally, and to assign to the same users full rights to connect from outside, and additionally, in accordance with the present embodiments to specifically restrict database access to any desired extent for any given user when connecting from the outside. Prior art firewalls are able to define that certain machines (identified by IP address) do not have access to computers that store the database but do not in fact inspect for or in any way restrict actual database usage.

Thus, the policies that can be set by the SQL-filter enable the system administrator to differentiate between access permissions granted to users when working locally and permissions they may be assigned when working externally. In addition, it is possible to use the information held in incoming data packets to determine where the external connection comes from. Thus certain external machines can be predefined as safe machines, or safe machines for given users. Policies, which are set based on user's id, SQL commands, and database objects, can thus also incorporate connecting locations.

The SQL-filter of the preferred embodiments thus preferably protects the databases within the LAN from unauthorized external access and ensures that unauthorized access attempts do not cross the firewall.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A security filter device including a server configured for monitoring an external network connection for database commands to protect database objects from unwanted access comprising:
   a data packet inspection unit resident on a node other than a database manager receiving the database commands, and coupled to the network connection for inspecting passing data packets to find and carry out an analysis of database operation text within said packet, the data packet inspection unit configured in association with a firewall between an external network and an internal LAN containing the database objects for guarding a respective database, the data packet inspection unit comprising:
      a packet analysis unit to look for structure associated with database operation text: and
      a parsing unit, associated with said packet analysis unit to parse said database operation text into underlying statements comprising at least database operation commands and database objects; and
   an enforcement unit, associated with said data packet inspection unit for applying enforcement rules to said data packet, based at least partly on said analysis, the enforcement unit operable to protect respective database objects, the data packet inspection unit configured to first identify database communication packets from other types of packets, and then to pass database destined access attempts to the enforcement unit for application of the enforcement rules based on the database operation commands and database objects.

2. The security filter device according to claim 1, wherein said data packet inspection unit is configurable to be positioned between two LANs.

3. The security filter device according to claim 1, wherein said data packet inspection unit is further operable to find information regarding sources of respective data packets and regarding data objects of respective commands.

4. The security filter device according to claim 3, wherein said enforcement rules each comprise at least one condition, said condition being the presence in the database operation text of a predetermined database operation command.

5. The security filter device according to claim 3, wherein said enforcement rules each comprise at least one condition, said condition being the presence in the database operation text of any one of a group of database operation commands belonging to a preformulated group.

6. The security filter device according to claim 3, wherein said enforcement rules each comprise at least one condition, said condition being the specification within the database operation text of a predetermined database object.

7. The security filter device according to claim 3, wherein said enforcement rules each comprise at least one condition, said condition being the specification within the database operation text of any one of a group of database objects belonging to a preformulated group.

8. The security filter device according to claim 1, further comprising a management module for setting said enforcement rules.

9. The security filter device according to claim 8, wherein said management module is further operable to define groups of database commands, said groups being usable to define said enforcement rules.

10. The security filter device according to claim 8, wherein said management module is accessible via a graphical user interface.

11. The security filter device according to claim 10, wherein said management module is operable to set an access policy comprising a plurality of rules, each rule specifying a group of commands, a group of users and a group of data objects, said access policy being transferable to said enforcement unit.

12. The security filter device according to claim 1, wherein at least some of said enforcement rules define logging activities and said enforcement unit further comprises logging functionality therefor.

13. The security filter device according to claim 1, wherein said inspecting comprises obtaining a signature from said database operation text and wherein at least some of said enforcement rules relate at least in part to said signatures.

14. The security filter device according to claim 1, wherein said data packet inspection unit is operable as an addressable node having a node address, the node address recognized by the external network.

15. The security filter device of claim 1, wherein the data packet inspection unit is disposed on an external connection to the database for examining data packets independently of local connections, the enforcement unit responsive to packets identified by the data packet inspection unit for selectively restricting access according to the enforcement rules.

16. The security filter device of claim 1 wherein:
the data packet inspection unit receives packets from a firewall, the received packets having passed access scrutiny imposed by the firewall, and identifies the received packets as database access packets, the database access packets emanating from a user and indicative of a requested operation to be performed on a database object; and
the enforcement unit determines selective access based on the emanating user, the requested operation, and the database object.

17. The security filter device of claim 1 wherein the structure is defined according to a database protocol for performing field based queries.

18. The security filter device of claim 1 wherein the database operation text includes a command denoting an action, and an object, denoting the data to be changed, the changed data including user data stored on behalf of a user for subsequent access and retrieval.

19. The security filter device of claim 1 wherein the enforcement rules referring to the database operation text include:
a command name indicative of at least one syntax element of a database protocol indicative of the commands the enforcement rule applies;
an object name indicative of database fields to which the enforcement rule applies;
an action to be performed upon application of the enforcement rule; and
a priority indicating precedence in the event multiple rules apply to the database operation text.

20. The security filter device of claim 1 wherein the data packet inspection unit is further configured for inspecting both the incoming commands and objects and a returned result of the commands and objects.

21. In a server configured for monitoring an external network connection for database commands, a method for protection of database objects from unwanted access comprising:
parsing, on a node other than a database manager receiving the database commands, a data packet to find database operation commands in said packet;
finding information regarding sources of respective data packets and regarding data objects of respective commands, said finding information regarding sources of respective data packets being carried out per user connection, the method further comprising associating said sources with data packets of said user connection, associating further comprising:
analyzing the data packets to look for structure associated with database operation text; and
parsing said database operation text into underlying statements comprising at least database operation commands and database objects; and
applying enforcement rules to said data packet, the enforcement rules specifying conditions based at least partially on the found information and on said database operation commands for protecting the respective database objects, the applied enforcement per user connection providing selective database access based on the user, database object and database operation independently of firewall enforcement actions, enforcement further comprising:
first identifying database communication packets from other types of packets, and
passing database destined access attempts for application of the enforcement rules based on the database operation commands and database objects.

22. The method according to claim 21, further comprising applying said enforcement rules selectively to said data packets, depending on information found in respective data packets by said parsing.

23. The method according to claim 22, wherein said database operation commands are arranged in groups and wherein said enforcement rules relate to said groups.

24. The method according to claim 23, wherein said sources are arranged in groups and said enforcement rules relate to said groups.

25. The method according to claim 24, wherein said database objects are arranged in groups and wherein said enforcement rules relate to said groups.

26. The method according to claim 21, further comprising arranging said database commands into groups and using said groups to define said enforcement rules.

27. The method according to claim 26, further comprising forming an access policy by arranging together a plurality of rules for use.

28. The method of claim 21 wherein parsing further comprises identifying data packets corresponding to a data access transaction conformant to a predetermined data access protocol.

29. The method of claim 28 wherein the data access transaction is indicative of statements corresponding to the database operation commands, further comprising interpreting the statements and comparing the statements to rules operable to indicate allowability of the data access transaction.

30. The method of claim 29 wherein the statements correspond to SQL text according to SQL syntax.

* * * * *